United States Patent
Gillam et al.

(10) Patent No.: US 9,409,525 B2
(45) Date of Patent: Aug. 9, 2016

(54) STORAGE BIN HAVING HIDDEN TOUCH PAD

(71) Applicants: Michael C Gillam, Addison Township, MI (US); Joseph S Dehner, Bloomfield Hills, MI (US)

(72) Inventors: Michael C Gillam, Addison Township, MI (US); Joseph S Dehner, Bloomfield Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 53 days.

(21) Appl. No.: 14/319,376

(22) Filed: Jun. 30, 2014

(65) Prior Publication Data

US 2015/0375687 A1    Dec. 31, 2015

(51) Int. Cl.
B60R 9/02 (2006.01)
B62D 33/023 (2006.01)
B60R 11/06 (2006.01)

(52) U.S. Cl.
CPC . B60R 9/02 (2013.01); B60R 11/06 (2013.01); B62D 33/023 (2013.01)

(58) Field of Classification Search
CPC ......... B60R 9/02; B60R 11/06; B62D 33/023
See application file for complete search history.

(56) References Cited

U.S. PATENT DOCUMENTS

| | | | |
|---|---|---|---|
| 4,938,398 A | 7/1990 | Hallsen | |
| 5,169,200 A | 12/1992 | Pugh | |
| 5,567,000 A | 10/1996 | Clare | |
| 5,615,922 A | 4/1997 | Blanchard | |
| 5,784,769 A | 7/1998 | Clare | |
| 5,819,390 A | 10/1998 | Clare | |
| 5,823,598 A | 10/1998 | Clare et al. | |
| 5,979,617 A | 11/1999 | Clare et al. | |
| 5,979,973 A | 11/1999 | Clare et al. | |
| 6,003,923 A | 12/1999 | Scott et al. | |
| 6,007,130 A | 12/1999 | Clare et al. | |
| 6,012,754 A | 1/2000 | Clare et al. | |
| 6,030,018 A | 2/2000 | Clare et al. | |
| 6,033,002 A | 3/2000 | Clare et al. | |
| 6,036,258 A | 3/2000 | Clare et al. | |
| 6,089,639 A | 7/2000 | Wojnowski | |
| 6,105,231 A | 8/2000 | Clare et al. | |
| 6,129,401 A | 10/2000 | Neag et al. | |
| 6,142,549 A | 11/2000 | Clare et al. | |
| 6,224,138 B1 | 5/2001 | Adsit et al. | |
| 6,237,211 B1 | 5/2001 | Clare et al. | |
| 6,439,634 B1 * | 8/2002 | Jensen | E05B 83/16 224/402 |

(Continued)

OTHER PUBLICATIONS

Photo of 2013 Nissan Titan Side Storage. http://www.trucktrend.com/features/news/2012/163_news121112_2013_nissan_titan_pricing/photo_35.html.

*Primary Examiner* — Glenn Dayoan
*Assistant Examiner* — Melissa A Black
(74) *Attorney, Agent, or Firm* — Ralph E. Smith

(57) ABSTRACT

A storage bin configuration for a motor vehicle is provided in accordance with the teachings of the present disclosure. The storage bin includes a storage bin body, a storage bin latch and a touch pad. The storage bin body has an outboard wall, an inboard wall, a forward wall and a rearward wall that collectively define a receptacle. The outboard wall forms a portion of an exterior of the vehicle. The storage bin latch is configured to move between a latched position and an unlatched position. In the latched position, the storage bin latch maintains the storage bin body in a closed position. In the unlatched position, the storage bin latch permits movement of the storage bin body to an open position. The touch pad is configured on the storage bin body at a location at least substantially concealed from view behind the outboard wall.

11 Claims, 6 Drawing Sheets

(56) References Cited

U.S. PATENT DOCUMENTS

| | | |
|---|---|---|
| 6,499,795 B2 | 12/2002 | Clare |
| 6,966,593 B2 | 11/2005 | Plentis et al. |
| 7,104,583 B2 | 9/2006 | Clare |
| 7,413,231 B1 | 8/2008 | Wood et al. |
| 7,686,365 B2 | 3/2010 | Thelen et al. |
| 7,828,356 B2 | 11/2010 | Wood et al. |
| 2001/0013709 A1 | 8/2001 | Clare et al. |
| 2001/0038217 A1 | 11/2001 | Clare et al. |
| 2001/0038218 A1 | 11/2001 | Clare et al. |
| 2001/0038219 A1 | 11/2001 | Clare et al. |
| 2001/0038230 A1 | 11/2001 | Clare et al. |
| 2001/0050491 A1 | 12/2001 | Clare et al. |
| 2004/0177478 A1* | 9/2004 | Louvel .............. E05B 81/78 16/430 |
| 2013/0270854 A1 | 10/2013 | Weller |

* cited by examiner

STORAGE BIN HAVING HIDDEN TOUCH PAD

FIELD

The present disclosure relates generally to motor vehicles and, more particularly, to a storage bin configured on a motor vehicle and that is movable from a closed position to an open position by actuation of a touch pad provided in a location obscured from plain view.

BACKGROUND

Motor vehicles such as pick-up trucks include a bed for carrying cargo. Recent designs have also provided cargo storage space configurations in a side panel adjacent the cargo bed. Such side panel storage space configurations provide receptacles that are suitable to store smaller items of cargo. Other storage space configurations incorporate storage boxes that may be accessed generally through the side panel or a lid generally provided between the side panel and the truck bed. While these storage space configurations work for their intended purpose, they are not always configured in a fashion so as to conveniently gain access through use of discrete opening mechanisms and/or to provide discrete storage bins that are easily accessed while in an open position.

SUMMARY

In one aspect, a storage bin configuration for a motor vehicle is provided in accordance with the teachings of the present disclosure. In an exemplary implementation, the storage bin includes a storage bin body, a storage bin latch and a touch pad. The storage bin body has an outboard wall, an inboard wall, a forward wall and a rearward wall that collectively define a receptacle. The outboard wall forms a portion of an exterior panel of the vehicle. The storage bin latch is provided on the storage bin body and is configured to move between a latched position and an unlatched position. In the latched position, the storage bin latch maintains the storage bin body in a closed position. In the unlatched position, the storage bin permits movement of the storage bin body as a whole to an open position. The touch pad is configured on the storage bin body at a location concealed from view behind the outboard wall. Upon actuation of the touch pad, the storage bin latch moves to the unlatched position.

According to additional features, the outboard storage bin wall further includes a top edge, a forward edge, a rearward edge and a bottom edge. The storage bin further comprises a hinge partially formed proximate the bottom edge of the outboard storage bin wall. The storage bin body rotates about the hinge between the closed and open positions.

According to other features, the touch pad is positioned on the storage bin body at a location that opposes a vehicle cabin of the motor vehicle. In an exemplary implementation, the touch pad is disposed on the forward storage bin wall and the forward edge of the outboard storage bin wall overlaps the touch pad. In an exemplary implementation, the storage bin body is positioned between the vehicle cabin and a rear wheel well of the motor vehicle.

In additional configurations, the touch pad is positioned on the storage bin body at a location that opposes a sidewall of a tailgate hingedly coupled to the motor vehicle. In an exemplary implementation, the storage bin is positioned between the tailgate and a rear wheel well of the motor vehicle.

In another aspect, a storage bin is configured on a motor vehicle and includes a storage bin body, a storage bin latch and a touch pad. The storage bin body has an outboard wall, an inboard wall, a forward wall and a rearward wall that collectively define a receptacle. The outboard wall forms a portion of an exterior of the vehicle. The storage bin latch is provided on the storage bin body and is configured to move between a latched position and an unlatched position. In the latched position, the storage bin latch maintains the storage bin body in a closed position. In the unlatched position, the storage bin latch permits movement of at least a portion of the storage bin body to an open position. The touch pad is configured on the storage bin body at a location concealed from view behind the outboard wall. Upon actuation of the touch pad, the storage bin latch moves to the unlatched position.

According to additional features, the storage bin body is collectively formed by an upper bin portion and a lower bin portion. In an exemplary implementation, the upper bin portion moves relative to the lower bin portion to the open position. The outboard wall is collectively defined by an upper outboard wall on the upper bin portion and a lower outboard wall on the lower bin portion. In an exemplary implementation, the storage bin latch is coupled to the upper outboard wall and the vehicle latch is coupled to the lower outboard wall.

According to additional configurations, a strut is coupled between the upper bin portion and the lower bin portion. The strut is configured to urge the upper bin portion generally upwardly away from the lower bin portion upon depression of the touch pad. The storage bin body extends generally from a forward location adjacent a vehicle cabin to a rearward location adjacent a tailgate of the motor vehicle. The forward wall is collectively defined by an upper forward wall on the upper bin portion and a lower forward wall on the lower bin portion. In an exemplary implementation, the touch pad is disposed on the upper forward wall and the upper outboard wall overlaps the upper forward wall. In an exemplary implementation, the touch pad is positioned on the storage bin body at a location that opposes the vehicle cabin of the motor vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
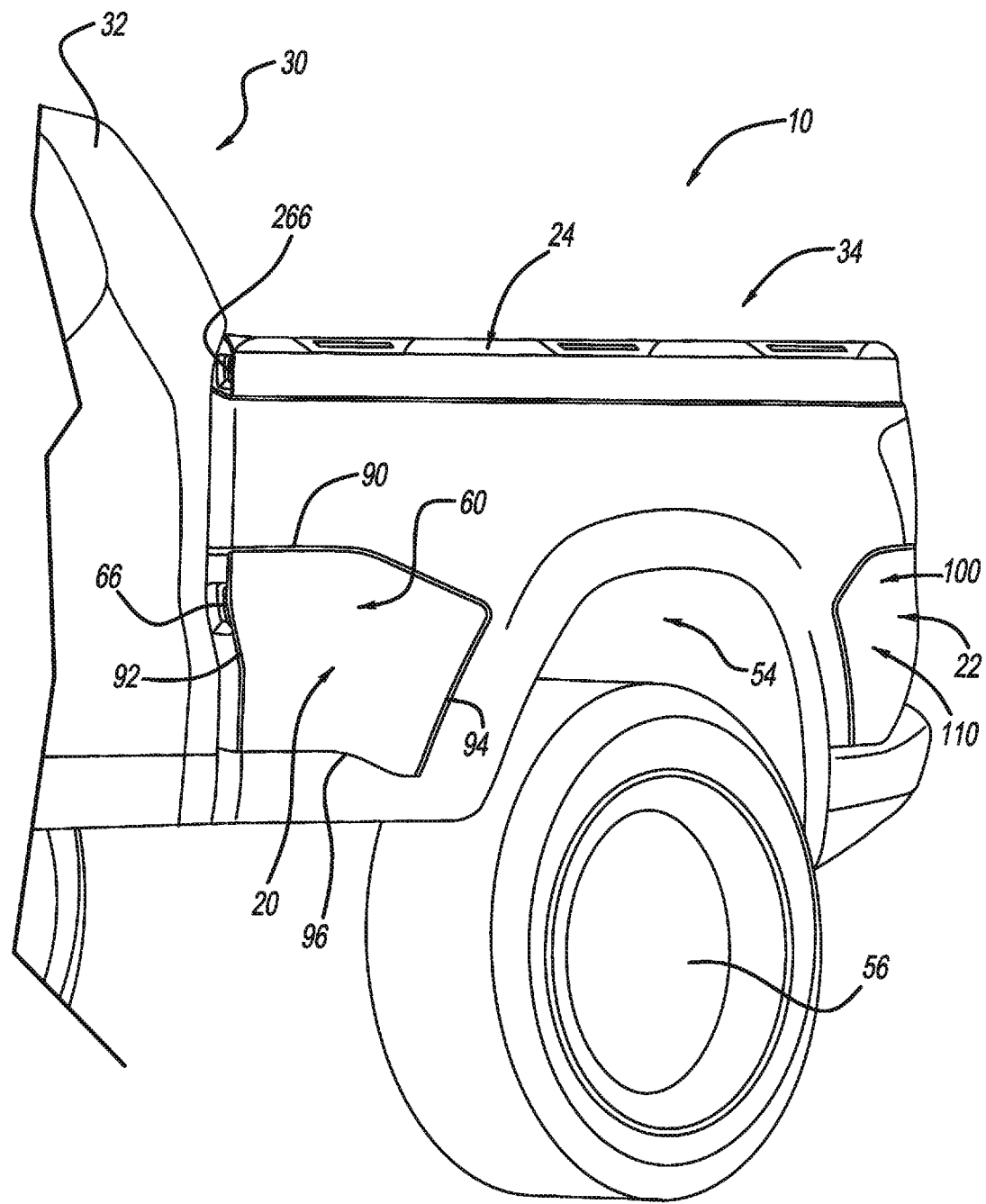
FIG. 1 is a side perspective view of a forward storage bin, a rearward storage bin and an upper storage bin according to the principles of the present disclosure and all shown in a closed position.
Figure 2:
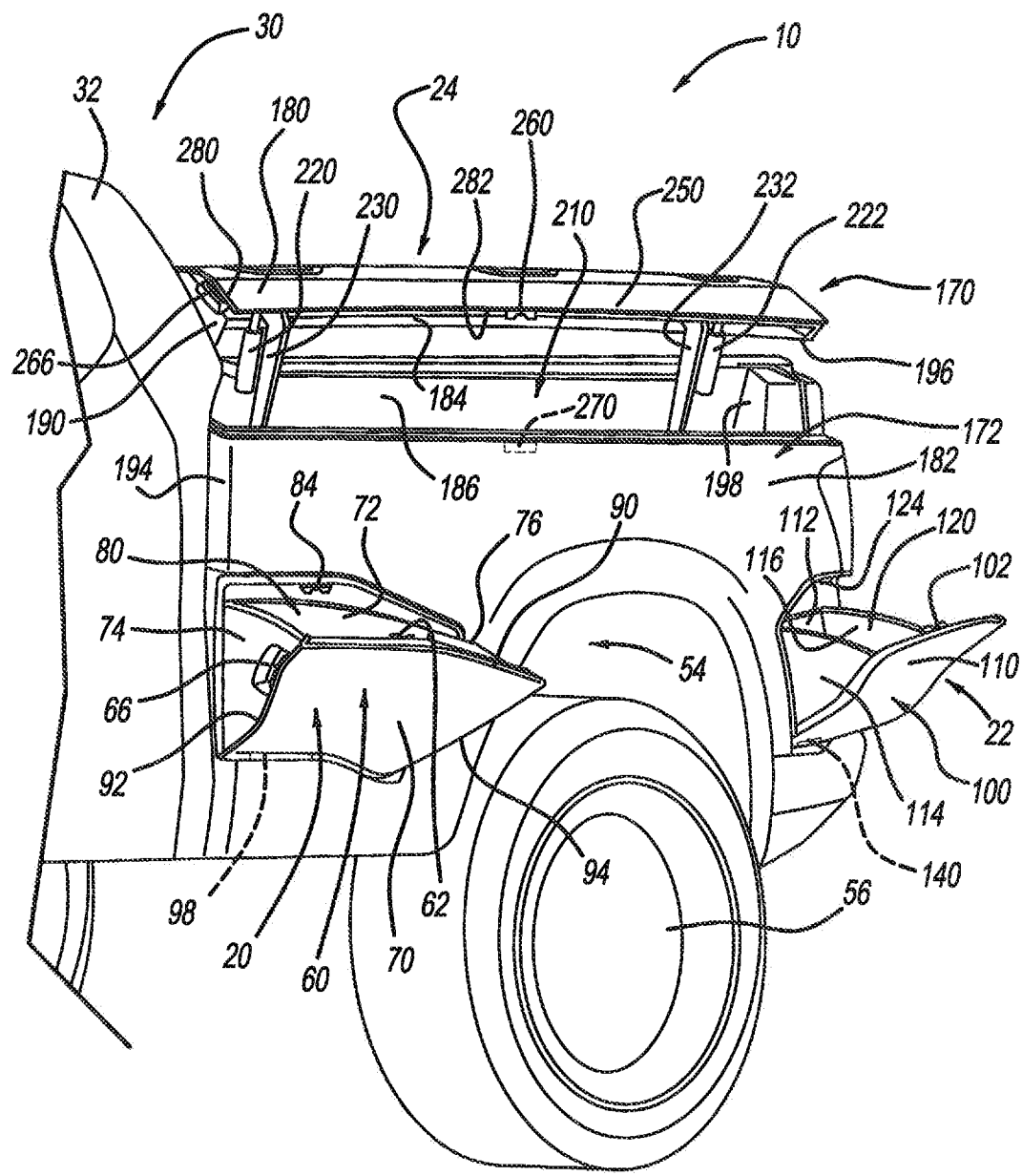
FIG. 2 is a side perspective view of the forward storage bin, the rearward storage bin and the upper storage bin all shown in an open position according to the principles of the present disclosure.

With initial reference to FIGS. 1 and 2, a storage bin configuration for a motor vehicle is shown and generally identified at reference numeral 10. In general, in the example illustrated, the storage bin configuration 10 includes a forward storage bin 20, a rearward storage bin 22, and an upper storage bin 24. As will become appreciated from the following discussion, the forward storage bin 20, the rearward storage bin 22 and the upper storage bin 24 provide convenient storage areas that may be easily accessed once the respective forward storage bin 20, rearward storage bin 22 and/or upper storage bin 24 (or lid associated therewith) are moved from the closed position (FIG. 1) to the open position (FIG. 2).

Moreover, the configurations set forth in the present disclosure provides storage bins and/or associated access arrangements that are discretely arranged on a motor vehicle such that each storage bin can be independently accessed relative to the other storage bins. In this regard and as will be discussed more fully herein, the respective forward storage bin 20, rearward storage bin 22 and upper storage bin 24 each have discrete touch pads that can be pressed to unlock the respective storage bins such that they can be moved from a closed position (FIG. 1) to an open position (FIG. 2). Each of the touch pads are located in positions that are hidden, generally hidden or substantially hidden from plain view. In this regard, it will be appreciated that while the discussion will continue with reference to the discrete touch pads being hidden from plain view or not exposed, the storage bins 20, 22 and 24 are visible or noticeable. For example, the storage bins 20, 22 and 24 are visible and/or can be seen relative to an exterior surface of surrounding or adjacent vehicle panels, which is shown in the various Figures where the perimeter cut lines associated with the bins 20, 22 and 24 are noticeable relative to the associated or adjacent exterior panel or sidewall of the vehicle.

In the Figures, the storage bin configuration 10 is illustrated as part of a motor vehicle 30. In the example shown, the motor vehicle 30 is a pick-up truck, however the storage bin configuration 10 may be configured for use with other vehicles such as those incorporating storage beds or cargo areas in general. The motor vehicle 30 generally includes a cabin 32 and a cargo bed 34. The cabin 32 surrounds occupants of the motor vehicle 30 and occupies an area in front of the cargo bed 34. The cargo bed 34 is generally provided by a bed frame 38 (see FIG. 5) and includes a forward wall 40, a rearward wall 42, a pair of sidewalls 44 (FIG. 5) and a floor 50. The rearward wall 42 is formed at least in part by a tailgate 52.

In the Figures shown and description set forth herein, focus will be given generally to a driver's side of the motor vehicle 30 that incorporates the forward storage bin 20, the rearward storage bin 22 and the upper storage bin 24. It will be appreciated however, that the same features and principles are equally applicable to the passenger's side of the motor vehicle 30. In this regard, while description is given to operation of the forward storage bin 20, the rearward storage bin 22 and the upper storage bin 24 on the driver's side of the motor vehicle 30, the passenger's side of the motor vehicle 30 are similarly equipped and operated.

Figure 3:
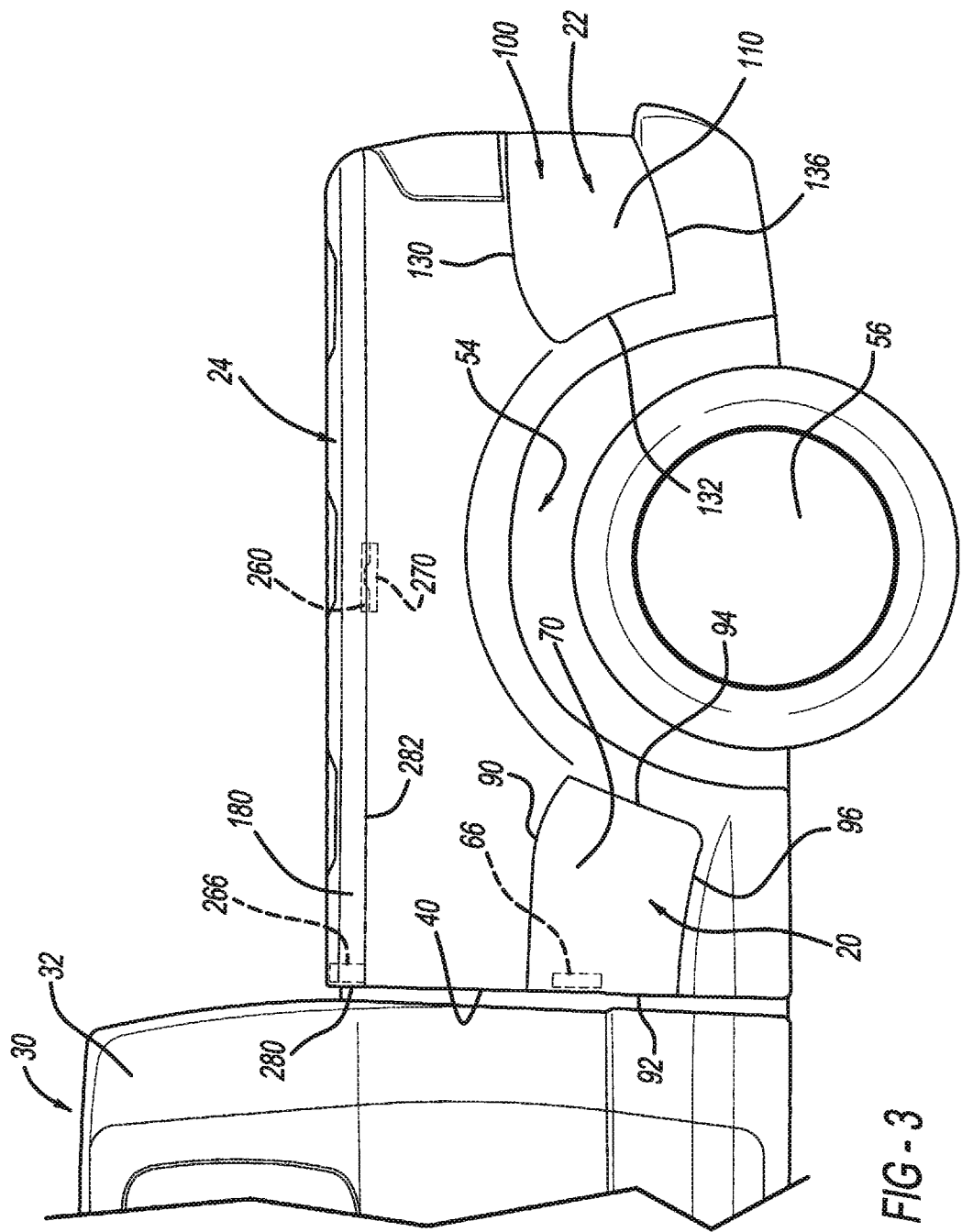
FIG. 3 is a side view of the motor vehicle of FIG. 1 illustrating the forward storage bin, the rearward storage bin and the upper storage bin all in the closed position according to the principles of the present disclosure.

With particular reference now to FIGS. 1-3, the forward storage bin 20 will be described in greater detail. The forward storage bin 20 generally includes a forward storage bin body 60, a forward storage bin latch 62 (FIG. 2) and a forward storage bin touch pad 66. The forward storage bin body 60 includes an outboard wall 70, an inboard wall 72, a forward wall 74 and a rearward wall 76. The outboard wall 70, the inboard wall 72, the forward wall 74 and the rearward wall 76 collectively define a receptacle 80.

Figure 6:
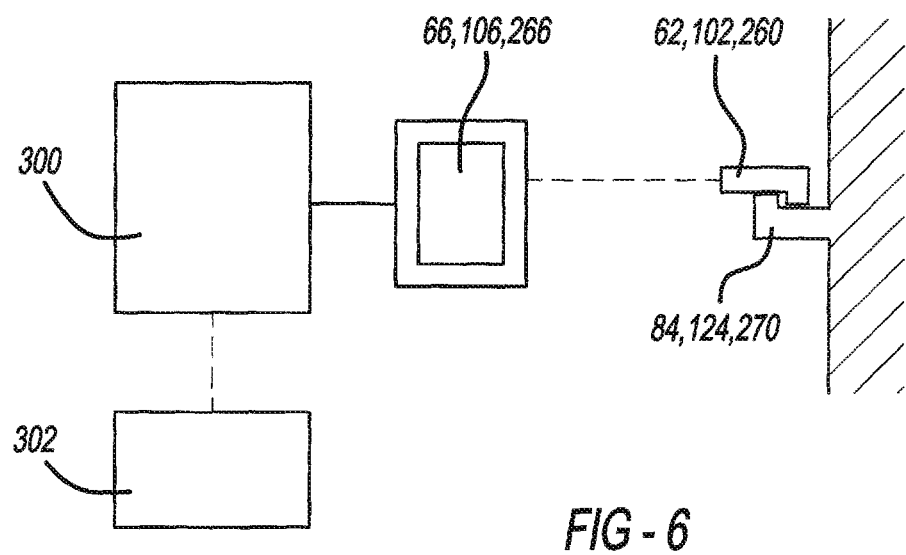
FIG. 6 is a schematic illustration of a touch pad, storage bin latch and vehicle latch according to the principles of the present disclosure and shown with the storage bin latch latched to the vehicle latch.
Figure 7:
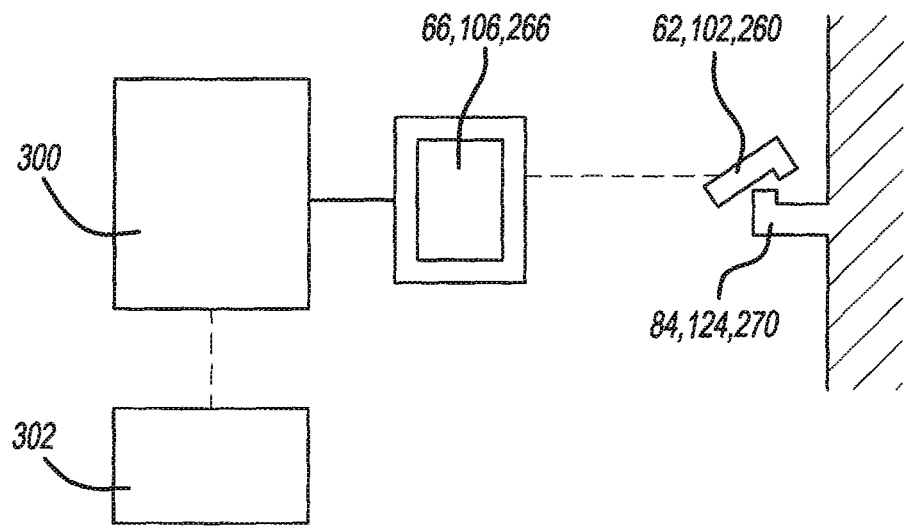
FIG. 7 is a schematic illustration of a touch pad, storage bin latch and vehicle latch according to the principles of the present disclosure and shown with the storage bin latch unlatched to the vehicle latch.

The forward storage bin latch 62 is configured to move between a latched position (FIGS. 1 and 6) and an unlatched position (FIGS. 2 and 7). In the latched position, the forward storage bin latch 62 is latched to a vehicle latch 84 maintaining the forward storage bin body 60 in a closed and locked position. In the unlatched position, the forward storage bin latch 62 is unlatched (and unlocked) from the forward vehicle latch 84 permitting movement of the forward storage bin body 60 as a whole to an open position.

The forward touch pad 66 is configured on the forward storage bin body 60 at a location that is concealed or at least substantially concealed from view behind the outboard wall 70 (see FIG. 3). For example, as viewed in FIG. 3, the forward touch pad 66 is hidden from view generally behind the outboard wall 70 of the forward storage bin 20. The forward touch pad 66 (as well as the other touch pad configurations discussed herein) may be any touch pad configuration suitable to be actuated by a user to actuate a latch mechanism, as will be readily appreciated by those skilled in the art. Examples of such touch pads include an electrical touch pad (e.g., deduces touch) or electromechanical touch pad (e.g., actuated by depressing the touch pad) that function in the form of an electronic or electromechanical switch. As will be discussed below in greater detail, the touch pads are in communication with associated latch mechanisms discussed herein, which can be electromechanical latch mechanisms known to those skilled in the art.

In the example implementation illustrated, the forward touch pad 66 is actuatable or movable between a static position (FIG. 6) and a depressed position (FIG. 7). In the depressed position, the storage bin latch 62 moves to the unlatched position. It will be appreciated that the configuration shown representing the forward storage bin latch 62 and forward vehicle latch 84 is merely exemplary. In this regard, other configurations may be incorporated. For example, other mechanical coupling mechanisms may be incorporated for selectively moving between locked and unlocked positions. In other configurations, the forward storage bin latch 62 and the forward vehicle latch 84 may additionally or alternatively incorporate magnetic couplings, clips, hooks and the like.

Additional features of the forward storage bin 20 will now be described. The outboard wall 70 includes a top edge 90, a forward edge 92, rearward edge 94 and a bottom edge 96. In an exemplary implementation, the forward edge 92 overlaps the forward wall 74. In one exemplary implementation, a forward portion of the outboard wall 70 terminating at the forward edge 92 overlaps the forward wall 74 and conceals the touch pad 66 from view. The forward storage bin 20 further includes a hinge 98 (FIG. 2) that is formed proximate the bottom edge 96 of the outboard wall 70. The forward storage bin body 60 is configured to rotate about the hinge 98 between the closed position (FIG. 1) and the open position (FIG. 2). The forward touch pad 66 is accessed in one example by reaching between the forward wall 40 of the cargo bed 34 and the cabin 32. A user then rotates one or more fingers generally rearwardly to engage and depress the forward touch pad 66. As best viewed in FIG. 3, the forward touch pad 66 is hidden or generally hidden from view behind the outboard wall 70. In an exemplary implementation, the forward touch pad 66 is positioned on the forward wall 74 at a location that opposes or directly opposes the cabin 32, as also shown in FIG. 3.

Once the forward touch pad 66 is depressed, the forward storage bin latch 62 moves from the position shown in FIG. 6 to the position shown in FIG. 7 causing the forward storage bin latch 62 to unlatch from the forward vehicle latch 84. In one configuration, a user pulls forward on the forward edge 92 of the outboard wall 70 causing the forward storage bin body 60 to rotate about the hinge 98 to the open position shown in FIG. 2.

Notably, the entire forward storage bin body 60 rotates outwardly providing easy access to the receptacle 80 and the contents stored in the forward storage bin 20. Explained further, because the forward storage bin body 60 rotates as a whole outwardly away from the motor vehicle 30, the contents stored in the storage bin body 60 also are moved outwardly for easy viewing and/or grasping. In some examples, an accessory opening device may additionally be incorporated such as a spring, gas strut or other mechanism to urge the forward storage bin body 60 into the open position upon depression of the forward touch pad 66.

Figure 4:
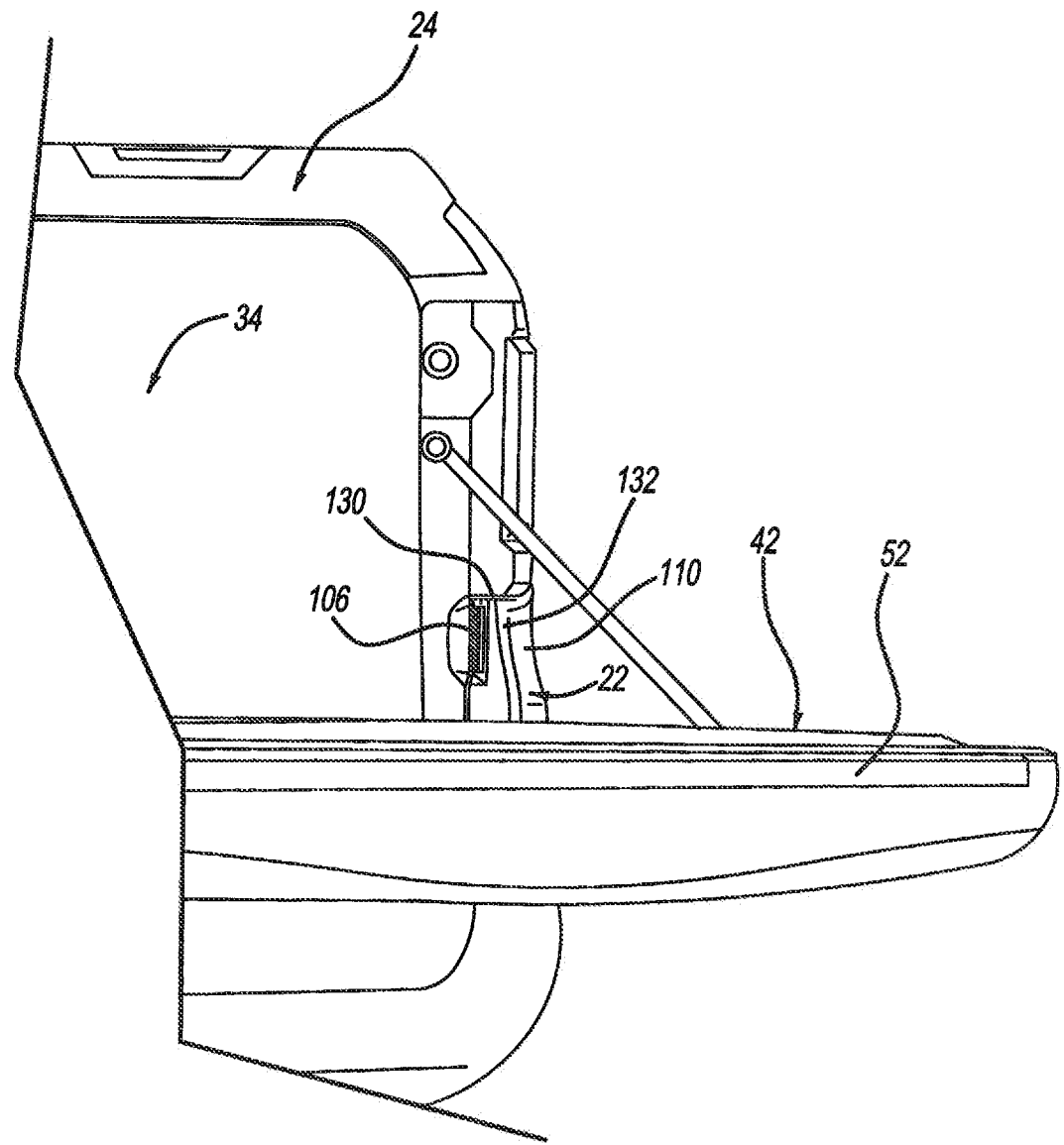
FIG. 4 is a side view of a rearward storage bin shown in a closed position and with a tailgate of the motor vehicle rotated to an open position according to the principles of the present disclosure.
Figure 5:
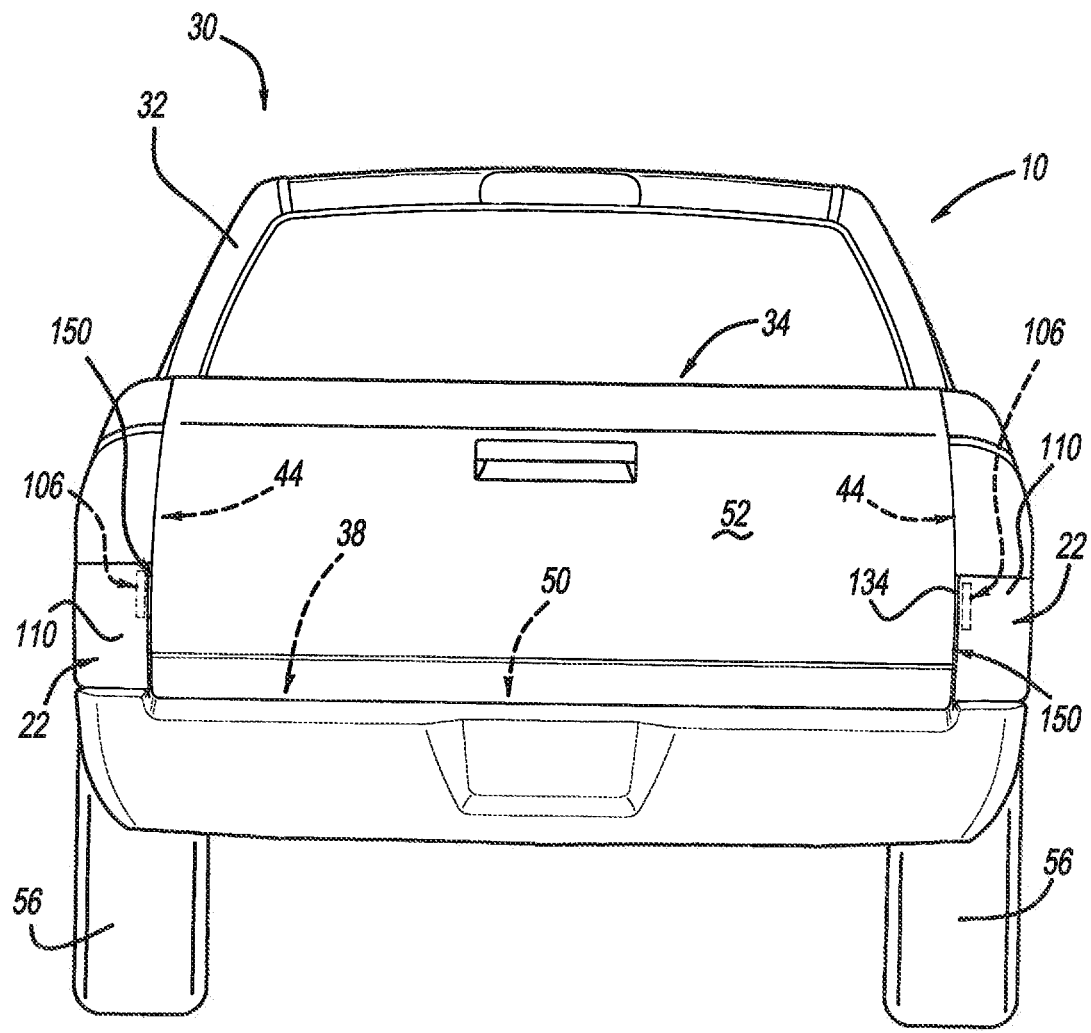
FIG. 5 is a rear view of the motor vehicle of FIG. 1 and shown with the tailgate in the closed position according to the principles of the present disclosure.

With continued reference now to FIGS. 1-3 and additional reference to FIGS. 4 and 5, the rearward storage bin 22 will be described in greater detail. The rearward storage bin 22 generally includes a rearward storage bin body 100, a rearward storage bin latch 102 (FIG. 2) and a rearward storage bin touch pad 106 (FIGS. 4 and 5). The rearward storage bin body 100 includes an outboard wall 110, an inboard wall 112, a forward wall 114 and a rearward wall 116. The outboard wall 110, the inboard wall 112, the forward wall 114 and the rearward wall 116 collectively define a receptacle 120.

The rearward storage bin latch 102 is configured to move between a latched position (FIGS. 1 and 6) and an unlatched position (FIGS. 2 and 7). In the latched position, the rearward storage bin latch 102 is latched to a vehicle latch 124 permitting movement of the rearward storage bin body 100 as a whole to an open position. The rearward touch pad 106 is configured on the rearward storage bin body 100 at a location at least partially concealed from view behind the outboard wall 110. For example, as viewed in FIG. 5, the rearward touch pad 106 is hidden from view generally behind the outboard wall 110 of the rearward storage bin 22.

The rearward touch pad 106 is actuatable or movable between a static position (FIG. 6) and a depressed position (FIG. 7). In the depressed position, the rearward storage bin latch 102 moves to the unlatched position. It will be appreciated that the configuration shown representing the rearward storage bin latch 102 and rearward vehicle latch 124 is merely exemplary. In this regard, other configurations may be incorporated such as those identified above with respect to the forward storage bin latch 62 and forward vehicle latch 84.

Additional features of the rearward storage bin 22 will now be described. The outboard wall 110 includes a top edge 130 (FIG. 3), a forward edge 132, a rearward edge 134 (FIG. 5) and a bottom edge 136. The rearward storage bin 22 further includes a hinge 140 (FIG. 2) that is formed proximate the bottom edge 136 of the outboard wall 110. The rearward storage bin body 100 is configured to rotate about the hinge 140 between the closed position (FIG. 1) and the open position (FIG. 2). The rearward touch pad 106 is accessed in one example by first rotating the tailgate 52 to the horizontal (open) position shown in FIG. 4. With the tailgate 52 rotated, a user then is permitted to gain access to the rearward touch pad 106. In the example shown, a user is precluded from reaching between a sidewall 150 (FIG. 5) of the tailgate 52 and the rearward edge 134 of the outboard wall 110 of the rearward storage bin 22. Explained further, there generally is not sufficient space between the sidewall 150 of the tailgate 52 and the rearward edge 134 of the rearward storage bin 22 to accept a user's finger. In this regard, the rearward storage bin 22 offers additional security as the tailgate 52 must first be unlocked and opened.

As best viewed in FIGS. 3 and 4, the rearward touch pad 106 is generally hidden from view behind the outboard wall 110. In one exemplary implementation, the rearward touch pad 106 is positioned on the rearward wall 116 and generally hidden or concealed from view by a rearward overlapping portion of the outboard wall 110. In another exemplary implementation, the rearward touch pad 106 may be positioned on an interior of the overlapping portion of the outboard wall 110 adjacent the rearward wall 116.

Once the rearward touch pad 106 is actuated or depressed, the rearward storage bin latch 102 moves from the position shown in FIG. 6 to the position shown in FIG. 7 causing the rearward storage bin latch 102 to unlatch from the rearward vehicle latch 124. In one configuration, a user pulls forward on the rearward edge 134 of the outboard wall 110 causing the rearward storage bin body 100 to rotate about the hinge 140 to the open position shown in FIG. 2. As with the forward storage bin 20, the entire rearward storage bin body 100 rotates outwardly providing easy access to the receptacle 120 and the contents stored in the rearward storage bin 22. As with the forward storage bin 20, an accessory opening device may additionally be incorporated such as a spring, a gas strut or other mechanism to urge the rearward storage bin body 100 into the open position upon depression of the rearward touch pad 106.

With continued reference now to FIGS. 1-5, the upper storage bin 24 will be described in greater detail. The upper storage bin 24 generally includes an upper storage bin lid portion 170 and a lower storage bin portion 172. As will become appreciated, the upper storage bin lid portion 170 is configured to move upwardly and outwardly away from the cargo bed 34 relative to the lower storage bin portion 172 from a closed (locked) position (FIG. 1) to an open (unlocked) position (FIG. 2).

The upper storage bin 24 includes an upper outboard wall 180, a lower outboard wall 182, an upper inboard wall 184, a lower inboard wall 186, an upper forward wall 190, a lower forward wall 194, an upper rearward wall 196 and a lower rearward wall 198. The upper storage bin 24 defines a receptacle 210. The upper storage bin lid portion 170 moves relative to the lower storage bin portion 172 by way of a forward strut 220 and a rearward strut 222. The forward strut 220 can be disposed between the lower bin portion 172 and the upper bin lid portion 170. Similarly, the rearward strut 222 can be disposed between the lower bin portion 172 and the upper bin lid portion 170. A forward arm 230 and a rearward arm 232 are rotatably coupled between the upper storage bin portion 170 and the lower storage bin portion 172 for facilitating movement of the upper storage bin lid portion 170 relative to the lower storage bin portion 172.

The upper storage bin 24 further includes an upper storage bin body 250 collectively defined by the upper storage bin lid portion 170 and the lower storage bin portion 172. The upper storage bin 24 further includes an upper storage bin latch 260 and an upper storage bin touch pad 266. The upper storage bin latch 260 is configured to move between a latched position (FIGS. 1 and 6) to an unlatched position (FIGS. 2 and 7). In the latched position, the upper storage bin latch 260 is latched to a vehicle latch 270 maintaining the upper storage bin body 250 in a closed and locked position. In the unlatched position, the upper storage bin latch 260 is unlatched (and unlocked) from the upper vehicle latch 270 permitting movement of the upper storage bin lid portion 170 relative to the lower storage bin portion 172. In an exemplary implementation, the upper storage bin touch pad 266 is configured on the forward storage bin wall 190 at a location at least partially concealed from view behind the upper outboard wall 180. For example, as viewed in FIG. 3, the upper storage bin touch pad 266 is hidden from view generally behind the upper outboard wall 180 of the upper storage bin 24.

The touch pad 266 is actuatable or movable between a static position (FIG. 6) and a depressed position (FIG. 7). In the depressed position, the upper storage bin latch 260 moves to the unlatched position. It will be appreciated that the configuration shown representing the upper storage bin latch 260 and the upper vehicle latch 270 is merely exemplary. In this regard, other configurations may be incorporated such as those discussed above.

Additional features of the upper storage bin 24 will now be described. The upper outboard wall 180 includes a forward edge 280 and a bottom edge 282. The upper touch pad 266 is accessed in one example by reaching between the forward wall 40 of the cargo bed 34 and the cabin 32. A user then rotates one or more fingers generally rearwardly to engage and depress the upper storage bin touch pad 266. As best viewed in FIG. 3, the upper storage bin touch pad 266 is generally hidden from view behind the upper outboard wall 180. In an exemplary implementation, the upper outboard wall 180 includes a forward portion extending beyond the upper forward wall 190 and terminating at the forward edge 280. This forward portion overlaps the upper forward wall 190 so as to hide or conceal the touch pad 166 from view. In an exemplary implementation, the touch pad 266 is positioned on the upper forward wall 190 so as to oppose or directly oppose the cabin 32.

Once the touch pad 266 is actuated or depressed, the upper storage bin latch 260 moves from the position shown in FIG. 6 to the position shown in FIG. 7 causing the upper storage bin latch 260 to unlatch from the upper vehicle latch 270. In one configuration, a user pulls forward on the forward edge 280 of the upper outboard wall 180 causing the upper storage bin portion lid 170 to move upwardly and outwardly away from the cargo bed 34 with the assistance of the forward and rearward struts 220 and 222.

With specific reference to FIGS. 6 and 7, the forward, rearward and upper storage bin touch pads 66, 106, and 266, in the example illustrated, are electrically connected to a body control module or controller 300 of the motor vehicle 30. The body control module 300 is electrically coupled to a battery or power source 302. In one configuration, a remote key FOB communicates a signal ultimately to the body control module 300 unlocking the motor vehicle 30 that in turn completes an electrical circuit with the respective forward, rearward and upper touch pads 66, 106, and 266. In this regard, when the motor vehicle 30 is locked, actuation or depression of the respective front, rear and upper touch pads 66, 106, and 266 by a user will not result in unlatching of the respective latches 62, 102 and 260. In addition, when the motor vehicle 30 is unlocked, such as by way of a remote key FOB, power is communicated to the forward, rearward and upper touch pads 66, 106 and 266 permitting movement of the respective latches 62, 102 and 260 from the locked position (FIG. 6) to the unlocked position (FIG. 7).

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A storage bin configured on a pick-up truck having a passenger cabin spaced apart from a cargo bed, the storage bin comprising:
    a storage bin body having an outboard wall, an inboard wall, a forward wall and a rearward wall that collectively define a receptacle, the outboard wall forming a portion of an exterior of the vehicle, the forward wall oriented toward the passenger cabin relative to the rearward wall;
    a storage bin latch provided on the storage bin body and configured to move between a latched position and an unlatched position, wherein in the unlatched position, the storage bin latch permits movement of the storage bin body as a whole to an open position; and
    a touch pad configured on the storage bin body at a location concealed from view behind the outboard wall, wherein upon actuation of the touch pad, the storage bin latch moves to the unlatched position;
    wherein the touch pad is positioned between the passenger cabin and the cargo bed on the forward wall of the storage bin body directly facing the passenger cabin such that the touch pad is accessed by reaching between the passenger cabin and a forward wall of the cargo bed.

2. The storage bin of claim 1, wherein a forward portion of the outboard wall overlaps the forward wall such that the forward portion overlaps and further conceals the touch pad from view.

3. The storage bin of claim 2, wherein the storage bin body is positioned between a vehicle cabin and a rear wheel well of the motor vehicle.

4. The storage bin of claim 1, wherein the outboard wall of the storage bin includes a top edge, a forward edge, a rearward edge and a bottom edge; and
    wherein the storage bin further comprises a hinge partially formed proximate the bottom edge of the outboard wall, and wherein the storage bin body rotates about the hinge between the closed and open positions.

5. A storage bin configured on a pick-up truck having a passenger cabin spaced apart from a cargo bed, the storage bin comprising:
    a storage bin body formed by an upper lid portion and a lower bin portion and having an outboard wall, an inboard wall, a forward wall and a rearward wall that collectively define a receptacle, the forward wall oriented toward the passenger cabin relative to the rearward wall, the upper lid portion configured to move relative to the lower bin portion to an open position to provide access to the receptacle, wherein in the open position, the upper lid portion is spaced apart from and above the lower bin portion;
    a storage bin latch provided on the storage bin body and configured to move between a latched position and an unlatched position, wherein in the unlatched position, the storage bin latch permits movement of the upper lid portion to the open position; and a touch pad configured on the storage bin body at a location concealed from view behind the outboard wall, wherein upon actuation of the touch pad, the storage bin latch moves to the unlatched position;

wherein the touch pad is positioned between the passenger cabin and the cargo bed on the forward wall of the storage bin body directly facing the passenger cabin such that the touch pad is accessed by reaching between the passenger cabin and a forward wall of the cargo bed.

6. The storage bin of claim 5, wherein a forward portion of the outboard wall overlaps the forward wall and the touch pad so as to further conceal the touch pad from view.

7. The storage bin of claim 5, further comprising at least one strut coupled between the upper lid portion and the lower bin portion, and wherein the at least one strut is configured to urge the upper lid portion to move generally upwardly away from the lower bin portion upon depression of the touch pad.

8. The storage bin of claim 5, wherein the outboard wall is collectively defined by an upper outboard wall on the upper lid portion and a lower outboard wall on the lower bin portion; and wherein the storage bin latch is coupled to the upper outboard wall and a vehicle latch configured to be selectively engaged by the storage bin latch is coupled to the lower outboard wall.

9. The storage bin of claim 8, wherein the forward wall is collectively defined by an upper forward wall on the upper lid portion and a lower forward wall on the lower bin portion, and wherein the touch pad is positioned on the upper forward wall.

10. The storage bin of claim 9, wherein the upper outboard wall includes the forward portion that overlaps the upper forward wall and the touch pad thereby concealing the touch pad from view.

11. The storage bin of claim 5, wherein the storage bin body extends substantially an entire length of the cargo bed of the vehicle from a forward location adjacent the passenger cabin to a rearward location adjacent a tailgate of the motor vehicle.

\* \* \* \* \*